May 8, 1951 B. E. PARKER 2,551,848

PIEZOELECTRIC CRYSTAL AND MEANS FOR AND METHOD OF CONTROLLING ITS FREQUENCY RESPONSE CHARACTERISTICS

Filed April 22, 1948

Inventor:
Billy E. Parker
By: Spencer, Marzall, Johnston & Cook
Att'ys

Patented May 8, 1951 2,551,848

UNITED STATES PATENT OFFICE 2,551,848

PIEZOELECTRIC CRYSTAL AND MEANS FOR AND METHOD OF CONTROLLING ITS FREQUENCY RESPONSE CHARACTERISTICS

Billy E. Parker, Quincy, Ill.

Application April 22, 1948, Serial No. 22,597

5 Claims. (Cl. 332—26)

The present invention relates in general to frequency control of alternating or fluctuating electrical energy, and has more particular reference to piezo-electric frequency control.

Quartz, because of its piezo-electric characteristics, is now commonly employed as a frequency standard, by mounting a section or plate of quartz between two electrodes suitably interconnected in an electric circuit in which the frequency of alternating electrical energy is to be controlled. The plate, when so used, is called a crystal, and is caused to vibrate mechanically in response to electrostatic forces established by application of electrical potential differentials on the electrodes between which the crystal is mounted for operation. The frequency of mechanical vibration of a quartz plate is substantially constant at a frequency which depends upon the physical dimensions of the quartz plate, so that when set in vibration, electrical impulses of frequency corresponding with the vibrating frequency of the plate may be established in an electrical circuit with which the crystal actuating plates are connected.

In producing piezo-electric quartz crystals, it is difficult to control the physical dimensions of a given crystal in order to obtain, exactly, a desired resonant frequency of mechanical vibration in the finished crystal. No matter how carefully the crystal is finished to size, its fundamental vibration frequency may be slightly different from the frequency desired, not only because of slight deviation from desired finished dimensions but also because of slight differences in density of the crystal material, and internal stresses within the crystal structure. Accordingly, it is presently the practice to manufacture a number of crystals, more or less empirically, then to measure the resonant frequencies of the finished crystals, then to refinish the same in an effort to obtain a crystal having exactly the desired frequency response, and finally, to select a crystal having the desired frequency response from among a number of samples, the remainder being then discarded. This procedure, of course, is expensive and increases the market price of piezo-electric crystals.

An important object of the present invention is to provide a crystal manufacturing process whereby crystals adjustable exactly to a desired response frequency may be produced in finished form in the first instance, thereby reducing rejects to a minimum and avoiding the necessity of repeatedly refinishing crystals to obtain a desired frequency response, by trial and error methods.

Another important object is to provide a piezo-electric crystal in finished form having a coating of a magnetostrictive material upon a face, or upon the opposite faces of the crystal for the purpose of altering, within limits, the vibration frequency response of the crystal.

Another important object is to provide a piezo-electric crystal having a layer of magnetostrictive material coated on a surface of the crystal in position to be influenced by a magnetic field of controlled intensity for regulating the vibrational frequency response of the coated crystal.

Another important object of the present invention is to regulate the resonant frequency of a piezo-electric crystal by varying the intensity of a magnetic field to which a layer of magnetostrictive material, applied on a surface of the crystal, is exposed.

Another important object is to control the resonant frequency response of a piezo-electric crystal by means of a layer of magnetic material adhered upon a surface, or upon the oppositely facing surfaces of the crystal by applying a magnetic field to influence the layers, and by regulating the intensity of the magnetic field.

Another important object resides in providing for frequency modulation by correspondingly modulating the intensity of a magnetic field in which is disposed a frequency control element comprising a piezo-electric crystal having a magnetostrictive layer applied on a face thereof.

Among the other important objects and advantages of the present invention is to provide simple and inexpensive means for regulating the vibrational frequency of a piezo-electric crystal in order thus to make inexpensively available frequency control means of improved character usable wherever necessary or desired, as for example, in electron discharge oscillators.

The foregoing and numerous other important objects, advantages, applications, and functions of the invention will become apparent as the same is more fully understood from the following description which, taken in connection with the accompanying drawings, discloses a preferred embodiment of the invention for the purpose of clearly demonstrating the same.

Referring to the drawings.

Figure 1:
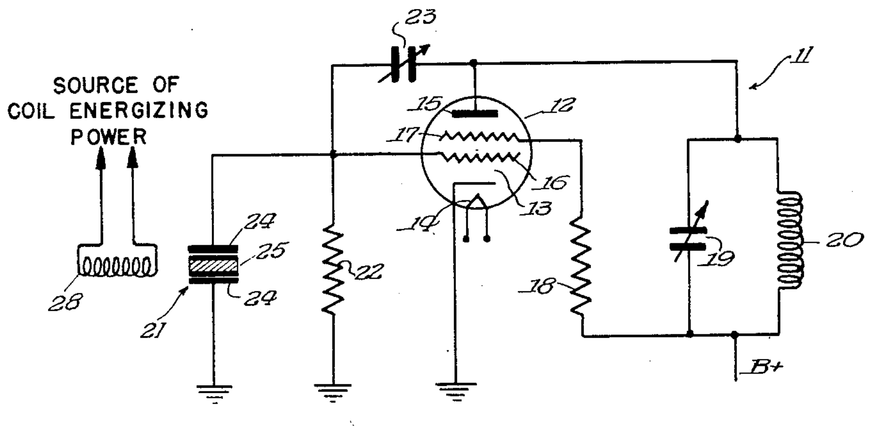
Fig. 1 is a diagrammatic view of an electron discharge oscillator controlled by a piezo-electric element embodying the present invention.

To illustrate the invention, the drawings show an electron discharge oscillator system 11, comprising an electron flow tube 12 having an electron emitting cathode 13, which is preferably connected to ground, a cathode heating filament 14, an anode plate 15, a control grid 16, and an additional grid element 17. While a five element tube is shown, it will be apparent, of course, that a three element tube may be utilized with essentially the same results, in fact, any tube capable of generating or sustaining oscillations may be employed. The tube is interconnected in an oscillating circuit comprising a resistance element 18 and a resonant circuit comprising a condenser 19 and an induction coil 20.

In order to operate the oscillator 11, the control grid 16 is connected to one side of a piezo-electric unit 21 embodying the present invention, the grid 16 also being connected to ground as through a resistor 22 which serves to complete the grid cathode circuit and to supply grid bias. The control grid 16 is also preferably connected with one side of a condenser 23, the other side of which is connected with the anode 15 to afford positive feedback to thereby assist in maintaining strong oscillations in the system.

The unit 21 may comprise a pair of spaced mounting plates 24, one of which may be electrically connected with the control grid 16 and the other of which may be grounded as shown. The unit also embodies a piezo-electric crystal 25 mounted between the plates in position to vibrate in the accomplishment of its piezo-electric function. If desired, the plates and crystal may be contained in a suitable housing to facilitate the physical mounting of the unit on the support panel or chassis of the equipment in which it is operatively connected.

Figure 2:
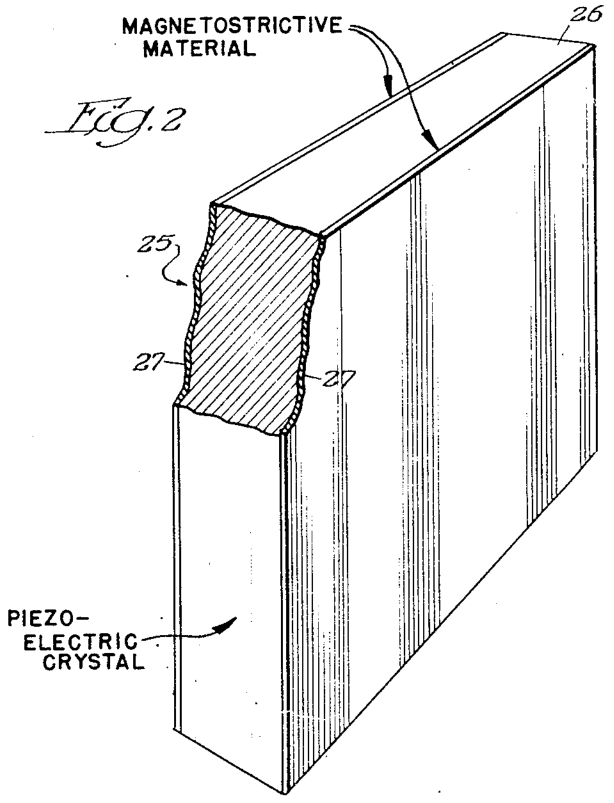
Fig. 2 is an enlarged perspective view, partially sectionalized, of a piezo-electric crystal embodying the present invention.

The crystal 25 as shown more particularly in Fig. 2 of the drawings comprises a plate or disc 26 of piezo-electric material such as quartz, the plate or disc being accurately finished to size and having a face, or both of the opposed faces thereof coated with a layer 27 of magnetostrictive material. The layer or layers 27 may comprise any magnetostrictive material, that is to say, a material capable of changing its dimensions under the influence of a magnetic field, the change in dimensions being a function of the strength of the field to which the material is exposed. Among the magnetostrictive materials which may be employed is nickel which may be applied as a layer upon the surface of the quartz crystal 26 in any suitable or preferred fashion as by anodically or otherwise sputtering nickel upon the surfaces to be coated. The layer or layers 27 may thus be applied on the crystal to a depth of the order of several microns, and up to, say, 0.01 inch.

The crystal 25 is not necessarily mounted between plates, as such. In practice the plate mounting and electrical contact means may consist of pins; or electrical connection may be effected by joining the lead conductors directly with the layers 27, as by soldering.

Associated with the unit 21 is a coil 28, which may be disposed adjacent the unit 21, or arranged to encircle and embrace the unit in position to establish a magnetic field passing through the magnetostrictive layers 27 when the coil is energized. Means is provided for energizing the coil from any suitable electric power source, as through control elements such as resistors, in order to regulate the intensity of the magnetic field produced by the coil.

Since the natural resonant frequency of the crystal 26 is determined not only by its physical dimensions but also largely by internal forces within the crystal, it is possible to regulate and alter the natural vibration frequency of the crystal by altering the internal forces therein through the action of the magnetostrictive layer or layers 27 exposed in the magnetic field of the coil 28 by adjusting the intensity of the magnetic field in order to adjust, by magnetostriction, the dimensions of the layers 27. Internal stresses thus set up within the crystal 26 by action of the layers 27 will alter its natural frequency of vibration. The present invention, by adjustment of the magnetic field produced by the coil 28, thus provides for altering and thereby adjusting the vibrational frequency of the crystal 26.

An important aspect of the present invention thus resides in applying a layer or layers of magnetostrictive material such as iron, or nickel, or Monel metal upon a face or faces of a quartz crystal, the layers being of uniform thickness, exceedingly thin, and mechanically bonded to the crystal throughout the coated areas thereof. The magnetostrictive layers have the property of lengthening and shortening when exposed to magnetic fields of varying intensities. The coated crystal accordingly, when mounted for operation within the influence of the adjustable magnetic field of the coil 28, may be regulated as to its vibrational frequency by adjusting the intensity of the magnetic field to which the layers 27 are exposed, thereby altering the resonant frequency response of the crystal.

It will be apparent, of course, to those skilled in the art that adjustable frequency crystals embodying the present invention may be utilized wherever required as a frequency standard; and it is also possible to employ crystals made in accordance with the present invention for frequency modulation purposes by suitably controlling the intensity of the magnetic field of the coil 28 in accordance with the desired frequency modulation.

It is thought that the invention and its numerous attendant advantages will be fully understood from the foregoing description, and it is obvious that numerous changes may be made in the form, construction and arrangement of the several parts without departing from the spirit or scope of the invention, or without sacrificing any of its attendant advantages, the form herein disclosed being a preferred embodiment for the purpose of demonstrating the invention.

The invention is hereby claimed as follows:

1. The method of frequency modulation which comprises exposing magnetostrictive material, coated as a layer on a surface of a piezo-electric crystal, to a magnetic field, and varying the intensity of the field continuously in accordance with a desired modulation to thereby correspondingly alter the dimensions of said layer in a direction transversely of said surface to correspondingly vary the response frequency of the crystal.

2. An electrical translation system embodying a frequency control, comprising a piezo-electric crystal having a layer of magnetostrictive material coated upon a surface thereof and integrally united with said surface, magnetic means for establishing a magnetic field in position to influence said layer, energizing means to electrically energize said magnetic means, and means operable to vary the intensity of said magnetic field, whereby correspondingly to alter the dimension of said layer in a direction transversely of said surface to correspondingly vary the vibrational response frequency of the crystal.

3. A piezo-electric crystal having a layer of magnetostrictive material coated upon a surface thereof and integrally united with said surface, means comprising a coil for establishing a magnetic field in position to influence said layer, energizing means to electrically energize said magnetic means, and means operable to vary the intensity of said magnetic field, whereby correspondingly to alter the dimension of said layer in a direction transversely of said surface to correspondingly vary the vibrational response frequency of the crystal.

4. A piezo-electric crystal having a layer of magnetostrictive material coated upon a surface thereof and integrally united with said surface, and means for establishing a magnetic field in position to control the dimension of said layer in a direction transversely of said surface in order to determine the vibrational frequency of said crystal.

5. A piezo-electric crystal having a layer of magnetostrictive material coated upon a surface thereof and integrally united with said surface, said layer being adapted, under the influence of a magnetic field, to alter its dimension in a direction transversely of said surface to correspondingly vary the vibrational response frequency of the crystal.

BILLY E. PARKER.

REFERENCES CITED

The following references are of record in the file of this patent:

UNITED STATES PATENTS

| Number | Name | Date |
|---|---|---|
| 1,632,150 | Sparkes | June 14, 1927 |
| 1,841,459 | Taylor | Jan. 19, 1932 |
| 1,848,630 | Hulburt | Mar. 8, 1932 |
| 1,886,815 | Hund | Nov. 8, 1932 |
| 1,927,141 | Thomas | Sept. 19, 1933 |
| 2,044,000 | Heising | June 16, 1936 |
| 2,083,420 | Atchisson | June 8, 1937 |
| 2,101,272 | Scott | Dec. 7, 1937 |
| 2,174,701 | Koch | Oct. 3, 1939 |
| 2,321,285 | Ehret et al. | June 8, 1943 |